May 6, 1958 F. J. DAHLINGHAUS 2,833,231
GRAIN DRILL WITH LATERALLY SWINGING FURROW OPENER
Filed Oct. 20, 1953 2 Sheets-Sheet 2
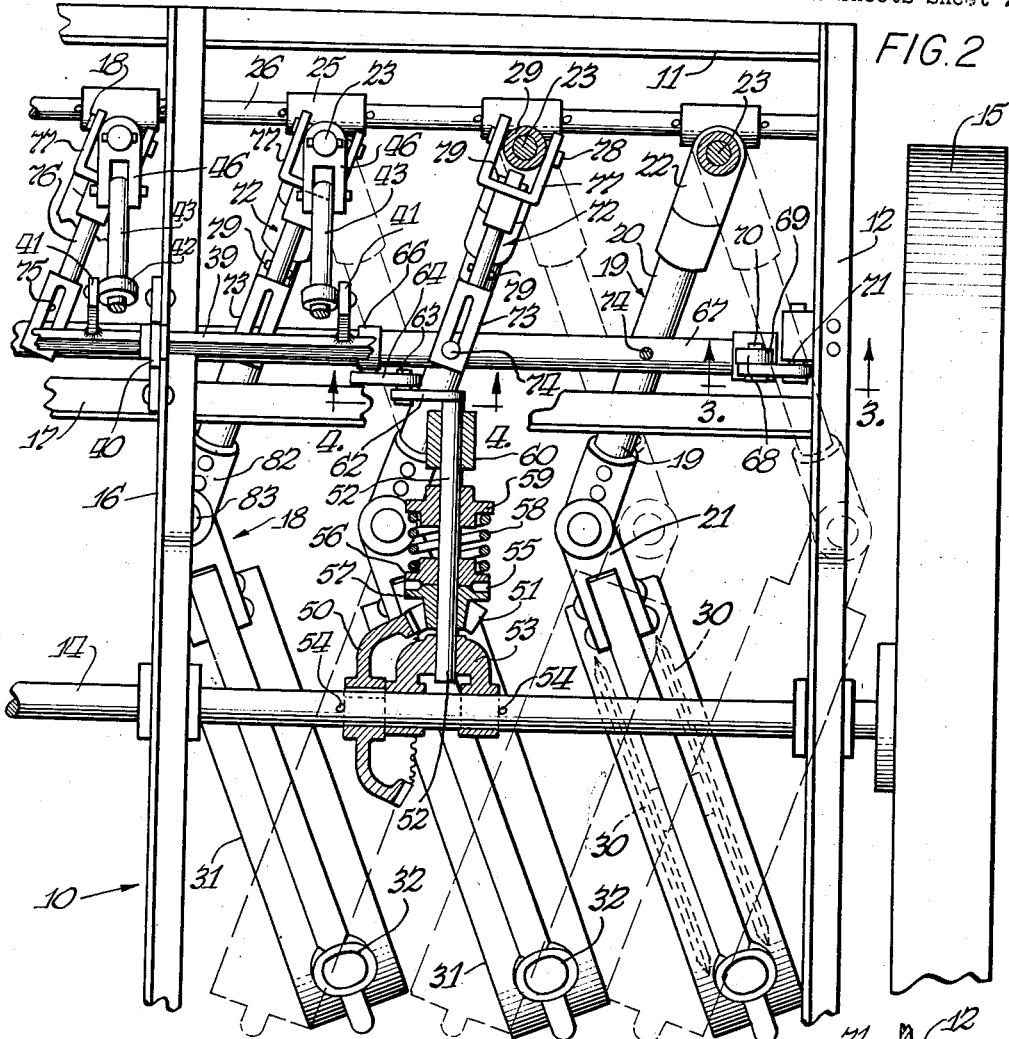
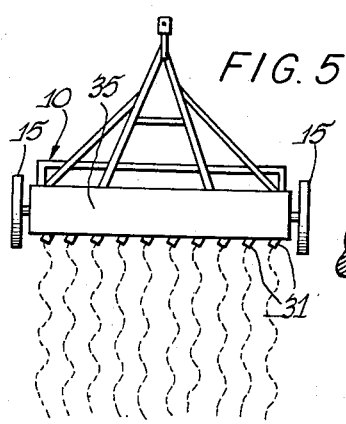
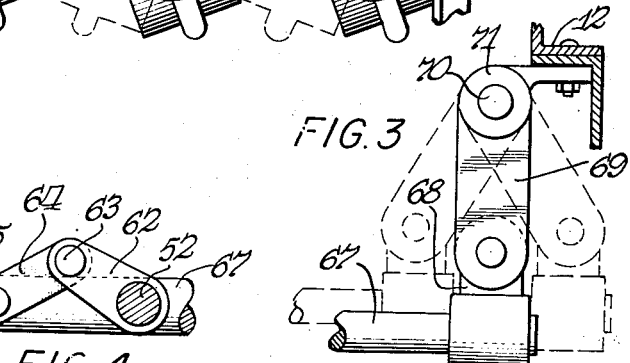
INVENTOR
FRANK J. DAHLINGHAUS
ATTORNEY

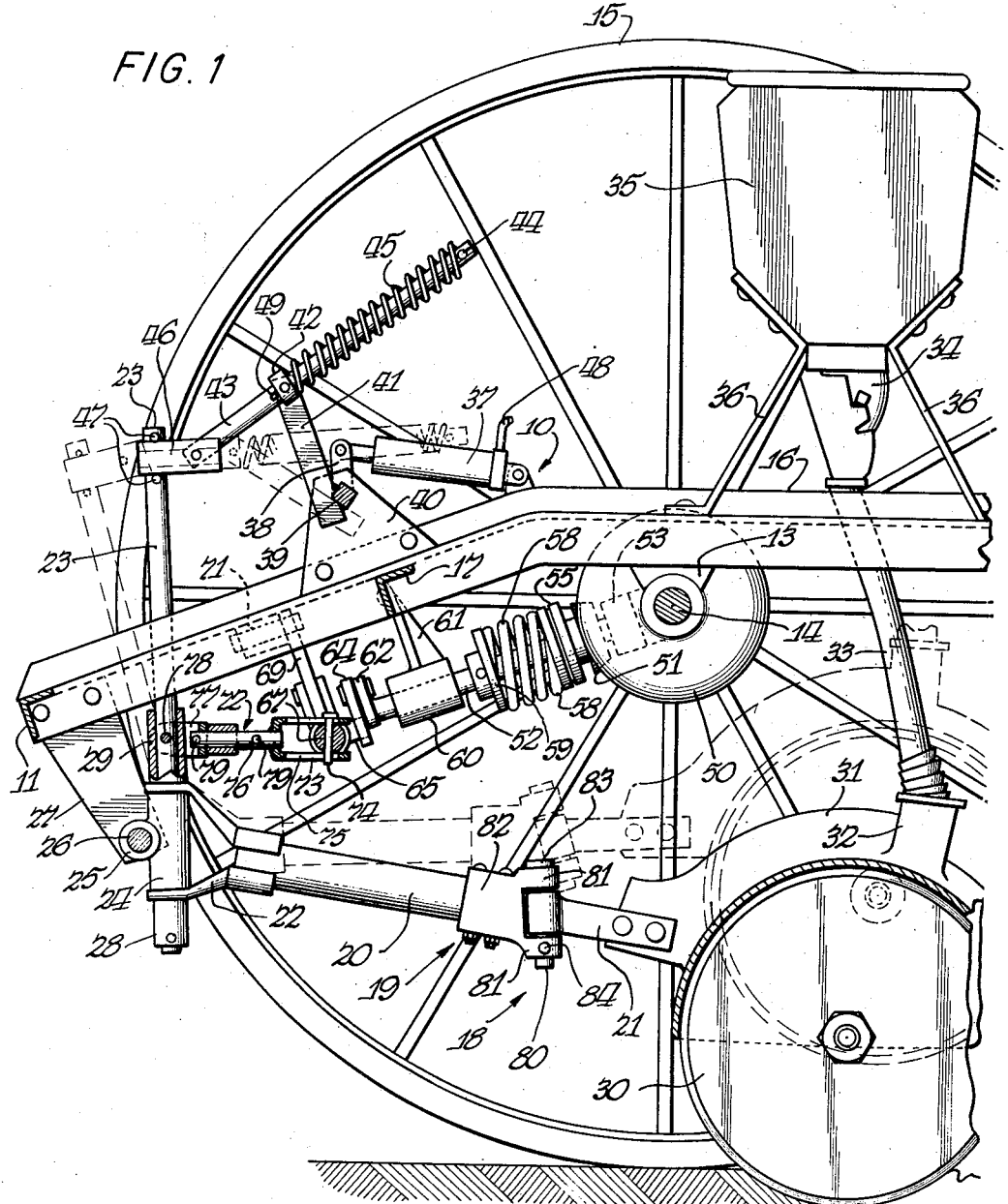

United States Patent Office 2,833,231
Patented May 6, 1958

2,833,231

GRAIN DRILL WITH LATERALLY SWINGING FURROW OPENER

Frank J. Dahlinghaus, Minster, Ohio

Application October 20, 1953, Serial No. 387,219

6 Claims. (Cl. 111—14)

This invention relates to agricultural implements and particularly to material dispensers. More specifically invention concerns a novel material dispenser of the grain drill type.

The conventional grain drill opens furrows in the ground in a straight line parallel to the direction of travel of the propelling force, such as a tractor, and grain carried by the receptacle is deposited in the furrow so that the growing crop emerges from the ground in a straight line. A grain drill forms closely spaced furrows for maximum grain production in a given area and comprises generally a transverse supporting frame mounted upon wheels carried at each end of the frame and having a grain receptacle thereon from which the material is dispensed to earth-penetrating tools also mounted upon the frame. I have found that the "per acre" yield of grain can be considerably increased if, instead of being planted in the conventional straight line, the grain is deposited in the ground in furrows of sinuous conformation. In this manner the length of the seed furrow, and therefore the number of seeds in a given length of furrow, may be considerably increased, resulting in markedly improved grain production per unit of area. Another advantage I have found in planting grain in wavy or sinuous rows, in addition to the improved production, is an improved ability of the grain to withstand the onslaughts of the elements in the form of high winds and heavy rains. Furthermore, the planting of crops in this manner results in improved conservation of moisture and soil.

In consideration of the foregoing, this invention contemplates and has for its object the provision of a method and means for forming a seed bed having a wavy or sinuous shape wherein seed is deposited so that the rows of the growing crop are also wavy or sinuous. By this means more plants are grown per linear foot of row seeded, and since row spacing may remain the same as with conventional seeding methods and equipment, the number of crop plants grown for any given unit of area is also much greater than when the seeds are planted in a straight line.

Another object of the invention is to provide a grain drill of novel construction, wherein means are provided for moving the seed dispensing mechanism in such a manner that the seed is deposited in the ground in sinuous furrows.

Another object of the invention is the provision of a grain drill or the like of novel construction having furrow opening units thereon including drawbars connected to the supporting frame for lateral oscillation relative thereto, and including power transmission mechanism on the supporting frame for effecting positive oscillation of the draft members.

A further object of the invention is the provision of a grain drill or the like of novel construction for planting grain in sinuous rows, wherein means are provided for laterally oscillating the furrow opener draft members and including means for mounting the earth-penetrating tools for castering relative to the draft member and to the support.

Other objects and advantages of the invention will become clear from the following detailed description when read in conjunction with the accompanying drawings wherein:

Fig. 1 is a view in side elevation, and partly in section, of a grain drill, with one wheel removed, having incorporated therein the features of this invention.

Fig. 2 is a plan view of a portion of the structure shown in Fig. 1, partly in section, illustrating the mechanism by which oscillation of the earth-working tools is effected, and with parts removed for clarity.

Fig. 3 is a detail view taken on the line 3—3 of Fig. 2.

Fig. 4 is a view on the line 4—4 of Fig. 2, and

Fig. 5 is a diagrammatic plan view of a grain drill illustrating the manner in which sinuous furrows are formed.

Referring particularly to the drawings, it will be noted that the implement with which this invention is concerned is a grain drill comprising a frame generally designated by the numeral 10 which is rectangular in shape, and includes a forward, transverse angle bar 11 and side members in the form of angle bars 12. Mounted upon the frame by means of a plurality of brackets 13 is a transversely extending drive shaft 14 supporting at its ends laterally spaced wheels 15, only one of which is shown. A transverse angle bar similar to front bar 11, and not shown, connects, the rear ends of the side frame members 12. Additional longitudinal and lateral bracing members 16 and 17, respectively, are also provided.

A plurality of laterally spaced furrow opener units are provided for mounting upon the supporting frame 10, and each unit is generally designated by the numeral 18. Furrow opener unit 18 includes a drawbar 19 which is divided into forward and rearward parts 20 and 21, respectively. The forward end of the drawbar part 20 has secured thereto a yoke 22 mounted upon a generally vertically extending connecting rod 23. Rod 23 carries near its lower end a bearing 24 provided with a boss 25 which rotatably receives a transversely extending draft bar 26. Draft bar 26 extends transversely of the machine near the forward end and is supported at the lower ends of two or more dependent brackets 27 affixed to the frame of the machine. Below the yoke 22 the rod 23 has mounted thereon and pinned thereto a collar 28 affixed by welding to the yoke 22, and another collar 29 is pinned to the rod above the yoke 22 and affixed to the yoke by welding, so that the bearing 24 is confined between the collar 28 and the collar 29.

At this point it will be observed that the drawbar 19, by virtue of its connection to the rod 23, may be swung laterally to opposite sides of a longitudinal center line upon rocking the rod 23 about its axis. It will likewise be noted that by virtue of the drawbar's connection to the draft member 26 the drawbar and the connecting rod 23 are capable of swinging movement about a horizontal transverse axis. The rear end of the rear drawbar part 21 has mounted thereupon an earth-working tool for forming a furrow in the ground in the shape of a pair of laterally spaced, downwardly converging earth-penetrating disks 30 secured to a seed boot 31 having a tubular portion 32 in which is received the lower end of a vertically and laterally flexible tube 33, the upper end of which is connected to the lower seed dispensing portion 34 of a grain box 35 mounted upon standards 36 affixed to the supporting frame 10. It may be understood that the grain box 35 is elongated and extends transversely the entire length of the machine. A flexible seed tube 33 connects each of the laterally spaced furrow opener units 18 to the hopper 35 to receive seed therefrom for deposition in the furrow formed by the furrow opening disks 39. Flexibility, both vertical and lateral, of the seed guide tube 33 is necessary to accommodate the lateral swinging or oscillation of the furrow opener unit 18 about the axis of the connecting rod 33, and the vertical swinging thereof about the axis of the draft member 26 when the earth-working tools are raised and lowered.

Vertical movement of the furrow opener units 18 between operating and transport positions may be accomplished by any suitable conventional lifting mechanism, such as a hydraulic ram 37 anchored to the frame 10 and connected to an arm 38 affixed to a transverse rockshaft 39 rockably mounted in suitable bearings carried in brackets 40 mounted upon the implement frame at laterally spaced locations. Also affixed to the rockshaft 39 is a rock arm 41, one for each furrow opener unit, having a swivel 42 mounted on its upper end and apertured for the sliding reception of a pressure rod 43 having a pin 44 at its upper rear end engaging a pressure spring 45, the other end of which abuts the swivel 42. The forward end of the pressure rod 43 is pivotally connected to a clip 46 mounted upon the upper end of the conecting rod 23 and confined between a pair of cotter keys 47. The ram unit 37 may be supplied with fluid under pressure through a hose line 48 from any source, not shown, such as a reservoir which may be carried by the tractor by which the implement is propelled. Extension of the ram unit 37 rocks the arm 38 in a counterclockwise direction, as viewed in Fig. 1, to also rock the arm 41. Swivel 42 engages a cotter key 49 in the rod 42 so that rocking of the arm 41 acts through the rod 43 and its pivotal connection to the connecting rod 23, to rock the latter counterclockwise about the axis of the draft member 26, the parts moving to the position indicated in dotted lines in Fig. 1. In the latter position of the parts, the earth-working tools are lifted to transport position. Upon retraction of the ram unit 37 the arm 41 on the shaft 39 rotates clockwise against the pressure of the spring 45 on pressure rod 43 to return the furrow opener unit 18 to the solid line or operating position of Fig. 1.

In the operating position of Fig. 1, it will be noted that the connecting rod 23 extends substantially vertically to provide a vertical axis for lateral oscillation of the furrow opener unit 18. This lateral oscillation of all the furrow opener units 18 is accomplished simultaneously by drive transmission mechanism which includes a bevel gear 50 splined to the main drive or wheel shaft 14 and engaging a pinion 51 mounted on a crankshaft 52 extending longitudinally at right angles to the shaft 14 and having its rear end rotatably carried in a bearing 53 also mounted upon the shaft 14. Pins 54 in the shaft 14 abut the gear 50 and the bearing 53 to prevent axial displacement thereof.

Also mounted upon the crankshaft 52 is a slip clutch 55 having a clutch face 56 keyed to the shaft 52 and engageable with a clutch face 57 forming a part of the pinion 51. A clutch spring 58 engages the slip clutch 55 at one end and at its other end a collar 59 mounted on a crankshaft.

The forward end of the crankshaft 52 is rotatable in a bearing 60 carried at the end of a bracket 61 secured to the angle bar 17 of the machine frame. The end of the shaft 52 projecting forwardly beyond the bearing 60 is bent at right angles to form a crank arm 62 pivotally connected by a pin 63 to one end of a connecting link 64, the other end of which is mounted upon a pin 65 extending rearwardly from a clamp 66 affixed to a transversely extending horizontal reciprocable bar 67. Each end of the reciprocating bar 67 has secured thereto and projecting upwardly therefrom a lug 68 pivotally connected to the lower end of a link 69 comprising a hanger by which the bar is suspended from the implement frame. The upper end of the link 69 is pivotally mounted upon a pin 70 rotatably carried in a bearing 71 secured to the adjacent angle bar 12 at the side of the implement frame.

Thus, rotation of the wheel shaft 14 acts through bevel gear 50, pinion 51, and clutch 55 to rotate the crankshaft 52 and crank arm 62, whereby reciprocation is imparted through connecting link 64 to the reciprocable bar 67, the bar 67 moving laterally to positions indicated in dotted lines in Fig. 3.

Motion is transmitted from the crankshaft 52 and reciprocable bar 67 to laterally swing the earth-working units 18 by mechanism which includes a telescoping link 72 which comprises a clevis 73 mounted upon the bar 67 by means of a pin 74 extending through slotted openings 75 provided in the clevis, and through the bar. The forwardly extending end of the clevis 73 has welded thereto a forwardly projecting shank 76 slidably receivable in an opening provided in another clevis 77 pivotally mounted upon the collar 29 by a pin 78 extending through the collar and the rod 23. A pair of cotters 79 are carried by the shank 76 to accommodate limited sliding movement of the shank in the clevis 77 to accommodate the lateral reciprocation of the rod 67 as well as the vertical and lateral movement of the furrow opening unit 18. Motion is therefore transmitted from the reciprocating rod 67 through the link 72 and the connecting rod 23 to laterally swing or oscillate all of the earth-working units 18 from the solid line to the dotted line position indicated in Fig. 2.

Since considerable side thrust, in operation, is exerted against the earth-working units 18, provision is made for castering of the earth-penetrating disk-carrying portion of the furrow opener units. Thus, the forward end of the rear part 21 of the drawbar 19 is connected to the forward part 20 by a generally vertically extending hinge pin 80 secured to the part 21 rotatably receivable in registering apertures provided in the spaced arms 81 of a clamp 82 affixed to the rear end of the forward part 20 of the drawbar and in the enlarged forward end of part 21. The upper end of the hinge pin 80 carries a cap 83 to prevent displacement of the pin from the clamp. In the operating position of the earth-penetrating disks 30 shown in Fig. 1, therefore, the latter is capable of castering about the axis of the pin 80 to offset the effects of the side thrust upon the earth-working tools. During oscillation of the earth-working unit 18, therefore, the drawbar 19 buckles about the axis of the pin 80 to move the parts between the solid line and the dotted line positions of Fig. 2.

The operation of the grain drill of this invention should be clearly understood from the foregoing description. The advantage of increased production of grain should likewise be clear from a study of Fig. 5, wherein the greater length of furrow in which seed is deposited by the provision of sinuous furrows is clearly indicated.

The invention has been described in its preferred embodiment wherein a pair of earth-penetrating disks are provided for each furrow opener unit. Where a single disk is utilized, of course, it is preferable that it not be permitted to caster, and in such instance the drawbar 19 may be made rigid, for example, by the insertion of a suitable pin in an opening 84 extending through the clamp 82 and the hinge pin 80. Further, the drive mechanism for transmitting power to the furrow openers to oscillate them has been described as deriving its power from the operation of the vehicle wheels. However, power may also be derived in any suitable manner from the power plant of a tractor by which the implement is propelled, and may be transmitted, if desired, through the intermediary of a power-take-off shaft. It should be understood that modifications may be made in the invention without departing from the spirit thereof or the scope of the appended claims.

What is claimed is:

1. In a grain drill including a hopper, a wheeled supporting frame and laterally spaced furrow openers, a longitudinally extending drawbar for each said furrow opener comprising front and rear portions and carrying the furrow opener at its rear portion, means pivotally connecting the front portion to the frame for lateral swinging, means hingedly connecting the rear portion of the drawbar to the front portion for lateral swinging relative thereto about a substantially vertical axis when the furrow opener is in its operating position, power transmission mechanism on the frame, and means operatively connecting said power transmission mechanism to the front portion of said drawbar or swinging the latter laterally successively to opposite sides of a longitudinal center line through the pivotal connection thereof to the frame.

2. The invention set forth in claim 1, wherein the connection of the drawbar to the frame includes a generally vertical rod pivotally mounted on the frame for swinging about a transverse horizontal axis, and the connection of the drawbar to the rod accommodates lateral swinging of the drawbar about the axis of the rod.

3. The invention set forth in claim 2, wherein power transmission mechanism on the frame is operatively connected to said rod for swinging the latter about its pivotal mounting on the frame to raise and lower the furrow opener.

4. In a material dispenser including a receptacle, a supporting frame therefor and a drawbar, means pivotally connecting the drawbar at its front end to the frame for lateral swinging of the rear end thereof and for vertical movement between operating and transport positions, a furrow opener extending rearwardly from said drawbar and pivotally connected at its forward end thereto to accommodate lateral swinging of the forward end thereof in response to the lateral swinging of the drawbar, power transmission mechanism on the frame, means operatively connecting said power transmission mechanism to said drawbar for effecting positive continuous swinging of the latter laterally in its operating position to cause the furrow opener to caster relative to the drawbar, and guide means having lateral flexibility connecting said receptacle to said furrow opener for directing the material thereto and accommodating the lateral swinging thereof.

5. The invention set forth in claim 4, wherein the drawbar is pivotally connected to the frame by means of a pivot rod which is inclined forwardly in a vertical plane when the drawbar and furrow opener are lifted and which is substantially vertical in the operating position of the latter to accommodate the lateral swinging of the drawbar.

6. In a material dispenser including a receptacle, a supporting frame therefor and a tool-carrying drawbar, means pivotally connecting the forward end of said drawbar to the frame comprising a pivot rod extending generally vertically when the tool-carrying drawbar is in operating position, means for mounting said rod on the frame for rocking thereof in a vertical plane to move said drawbar between operating and transport positions, power transmission means on the frame, mechanism operatively connecting said power transmission means to said drawbar comprising a transverse reciprocating member, depending links pivotally connected to the frame and to said member to accommodate said reciprocation thereof, and an operating connection between said member and said drawbar for swinging the latter about the axis of said rod in response to reciprocation of the member.

References Cited in the file of this patent
UNITED STATES PATENTS

| | | |
|---|---|---|
| 407,359 | Lawrence et al. | July 23, 1889 |
| 1,074,208 | Rowley | Sept. 30, 1913 |